United States Patent [19]
Searle et al.

[11] Patent Number: 5,518,562
[45] Date of Patent: May 21, 1996

[54] FRICTION WELDING

[75] Inventors: John G. Searle, Cannock; Frederick J. Harris, Birmingham, both of England

[73] Assignee: Rolls-Royce plc, England

[21] Appl. No.: 242,462

[22] Filed: May 13, 1994

[30] Foreign Application Priority Data

May 13, 1993 [GB] United Kingdom ............... 9309824
May 13, 1993 [GB] United Kingdom ............... 9309865

[51] Int. Cl.$^6$ ................................................ B23K 20/12
[52] U.S. Cl. ................... 156/73.8; 156/580; 228/2.1; 228/44.3; 228/112.1
[58] Field of Search ................... 156/73.5, 580.2, 156/580; 228/2.1, 112.1, 44.3

[56] References Cited

U.S. PATENT DOCUMENTS

| | | | |
|---|---|---|---|
| 3,840,168 | 10/1974 | Searle et al. | 228/2.1 |
| 3,899,378 | 8/1975 | Wragg et al. | 156/73.5 |
| 4,239,575 | 12/1980 | Leatherman | 156/272 |
| 4,905,883 | 3/1990 | Searle | 228/2.1 |
| 4,995,544 | 2/1991 | Searle | 228/2.1 |
| 5,148,957 | 9/1992 | Searle | 228/2.1 |
| 5,203,082 | 4/1993 | Bontems | 156/73.5 X |

FOREIGN PATENT DOCUMENTS

| | | |
|---|---|---|
| 0-290-134 | 11/1988 | European Pat. Off. . |
| 1-322-815 | 7/1973 | United Kingdom . |
| 1-460-752 | 1/1977 | United Kingdom . |

*Primary Examiner*—David A. Simmons
*Assistant Examiner*—J. Sells
*Attorney, Agent, or Firm*—Oliff & Berridge

[57] ABSTRACT

A new method of friction welding, particularly suitable for manufacturing BLISKS and BLUMS for gas turbine engine rotors, in which the disc or drum rotor is angularly reciprocated while the airfoil blades are pressed radially against the rotor circumference. A machine for carrying out the method has a workpiece holder and a counterbalancing member mounted for angular reciprocation and coupled together by torque transfer means to constitute a resonant system. In operation the machine is driven at or near its natural frequency of oscillation. The natural frequency can be tuned by adjusting the stiffness of the torque transfer means. The machine also includes a drive mechanism.

27 Claims, 7 Drawing Sheets

FRICTION WELDING

BACKGROUND OF THE INVENTION

This invention relates to improvements relating to friction welding.

It has been known for many years that two components, even metal components can be welded together by rubbing the components one against the other and urging them together. The frictional heat generated between the components melts, or at least softens, the material of one component, and more usually both components, so as to form a friction weld. It is known to friction weld by producing relative rotary motion. It is known to friction weld by producing relative orbital motion. It is known to friction weld by producing relative linear reciprocatory motion.

One example of a technical field in which friction welding is currently seen as having useful applications is in the field of making compressors or turbines for aircraft engines. Compressor assemblies may comprise a blisk (blades plus integral disc), or a blum (blades plus integral drum) which is effectively several blisks joined together.

SUMMARY OF THE INVENTION

According to a first aspect of the invention we provide a method of friction welding a first component to a workpiece, or second component, comprising producing relative angular reciprocatory movement between the first and the second component, and urging the components together with a weld-pressure generating force.

Thus the two components move in a new angular reciprocatory manner to and fro relative to each other.

This is a departure from previous friction welding techniques and allows us to weld simultaneously several radial blades to a disc using angular friction welding.

The weld-pressure generating force may be applied radially relative to the axis about which angular reciprocatory movement occurs, or axially, or in a combination of these directions.

According to a second aspect of the invention there is provided angular friction welding apparatus comprising a first component holder adapted to hold a first component, a second component holder adapted to hold a second component, angular reciprocatory movement generating means adapted to cause relative angular reciprocatory movement between the first and second component holders, and weld pressure generating means adapted to urge the two component holders together whereby in use to generate weld pressure between the components.

The weld pressure generating means may be adapted to generate a weld pressure radially relative to the axis about which angular reciprocatory movement occurs, or axially, or in a combination of these directions. The weld-pressure generating means may comprise slide means.

According to a third aspect of the invention we provide angular friction welding apparatus comprising a workpiece mounting member and a counterbalancing member coupled together, the counterbalancing member being adapted to move angularly in the opposite sense to the workpiece mounting member.

Preferably torque transfer means is provided between the workpiece mounting member and the counterbalancing member.

Preferably energy storing means is provided adapted to convert kinetic energy into potential energy and realise it cyclically. The workpiece mounting member is preferably coupled to energy storing means. The counterbalancing member is preferably coupled to energy storing means. The energy storing means may comprise two energy storing members or sets of members.

Preferably the energy storing means comprises one or more resilient members, which are most preferably elongate, for example torsion bars. The or each resilient member preferably extends in a generally axial direction.

According to a fourth aspect of the invention we provide angular friction welding apparatus comprising a workpiece mounting member and energy storing means adapted to convert kinetic energy into potential energy and release it again.

Preferably the apparatus has a natural frequency of oscillation, and tuning means is provided to adjust the natural frequency of the apparatus. The tuning means may adjust the mass or inertial moment of the workpiece mounting member and/or the counterbalancing member. Alternatively, or additionally, the tuning means may adjust the torsional rigidity of the apparatus. The tuning means may adjust the characteristics of the energy storing means.

The first component holder or the counterbalancing member or both are preferably mounted on a base member via bearings such as hydrostatic or film bearings. There are bearings adapted to take a radial load, and bearings adapted to take an axial load.

Reciprocatory drive means is preferably provided to drive the first component holder angularly about the axis for angular friction welding reciprocatory movement. Alternatively the drive means may drive the counterbalancing member.

The drive means preferably has two output members which reciprocate in opposite directions. The two output members may be attached to opposite ends of a diameter of the holding member, and are preferably in substantially the same plane which is perpendicular to the axis of angular friction welding. Alternatively one output member may be connected to the holding member, and the other to the counterbalancing member, the drive means effectively driving both the holding member and the counterbalancing member. If both members are driven there may be no need for the torque transfer means. However, the torque transfer means may be provided in any case.

There may be more than two output members. For example both the holding member and the counterbalancing member may be driven by a respective pair of output members.

The drive means may include a conversion means adapted to convert reciprocatory movement of an input member into reciprocatory movement of a first output member and reciprocatory movement of a second output member being out of phase with that of the first member, and preferably in anti-phase. The conversion means may be an invention in its own right.

BRIEF DESCRIPTION OF THE DRAWINGS

Embodiments of the invention will now be described by way of example only with reference to the accompanying drawings of which.

DETAILED DESCRIPTION OF PREFERRED EMBODIMENTS

Figure 1:
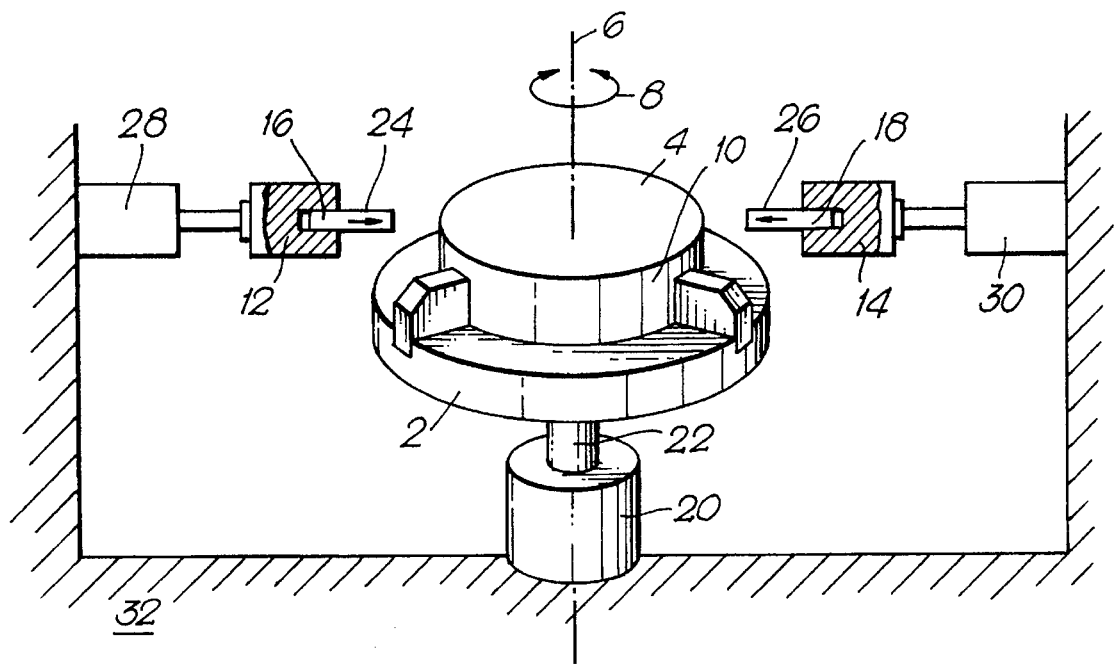
FIG. 1 shows schematically an angular friction welding technique.

FIG. 1 shows an angular friction welding apparatus comprising first and second component holders for holding two components which are to welded together. Component holder 2 is adapted to hold a first component 4, such as a blisk or blum, mounted for angular reciprocal movement about an axis 6. Preferably the angular reciprocal movement is rotary movement, as indicated by arrow 8. In cases where the first component is a compressor or turbine disc or drum the component has a circular periphery 10 and the angular reciprocal movement 8 is so arranged that it is purely rotary movement about the centre axis of the disc or drum. The component holder 2 is adapted to mount the component 4 such that its axis of symmetry and the axis 6 of the reciprocal movement are wholly concentric without axial or transverse components of movement.

Second and third component holders 12, 14 are adapted to hold respectively second and third components 16, 18 which are to be joined to the first component 4. In the particular example being described these second and third components are in the form of airfoil blades. In the process of fabricating a blisk or blum a multiplicity of such airfoil blades are joined to the circumferential periphery 10 of the disc or drum 4.

The first component holder 2 is coupled to angular reciprocatory movement generating means 20, in the drawing by means of a shaft 22. The drawing however is primarily schematic and in practice the components of the apparatus may be arranged differently. The movement generating means 20 is adapted to cause relative angular reciprocatory movement between the first and further, ie the second and third, component holders. The extent of the angular movement need not be great, for example in the case of a typical compressor disc having a diameter of the order of half a meter it may be, say, an arc of 3 mm. As previously mentioned in the present example this movement is purely rotary so that any point on the disc or drum periphery oscillates circumferentially by 3 mm substantially without any axial, or any other, component of movement.

In order to accomplish frictional welding weld pressure generating means is arranged to urge the second and third component holders 12, 14 towards the circumference of the first component 4. The blades 16, 18 are held by the component holders 12, 14 and are urged into engagement with the sides of the blisk or blum 4 in radial directions, along the lines of arrows 24 and 26. The reciprocation of the blisk or blum 4 relative to the two blades 16, 18 initially causes heat to be generated in the interface region by friction. Very high temperatures are reached in the interface sufficient to cause softening of the material. The application of radial forces to the blades causes material to be upset from the interface. At this point in the process the reciprocal movement is halted while radial pressure is maintained. As movement ceases welding occurs.

It is preferred, as in this example, that two diametrically opposed blades are welded in simultaneous operation so that their radial forces balance out. Of course, welding could be achieved with only one blade at a time. It is not essential to have two diametrically opposed blades, but it does have advantages in that the welding forces are equal and opposite and, therefore, balance each other.

These welding forces are applied to the second and third component holders 12,14 by means of weld pressure generating means 28,30 respectively. In the preferred example the means 28,30 are hydraulically actuated rams which are securely mounted on the bed or basic structure 32 of the apparatus. The basic structure of friction welding machines is substantial, indeed massive, and as in this instance well able to react the reaction forces acting on the weld force generating rams 28,30 during a welding operation.

The first component holder 2 is shown schematically in the drawing as a circular table carrying a plurality of adjustable clamping features, in the manner of a three or four jaw chuck for example. However, this is not intended to be limiting upon the invention, and a preferred form of mounting table and mounting tooling is described in co-pending British Patent Application Nos GB 9309865.5, GB 9309864.8 and GB 9309819.2. In like manner the second and third component holders 12,14 are illustrated very simply in diagrammatic form, one example of a practical component holder particularly adapted for holding airfoil blades is known from GB 9011605.4 and GB 8914273.1, and another example is described in co-pending British Application No GB 9309822.6.

Figure 2:
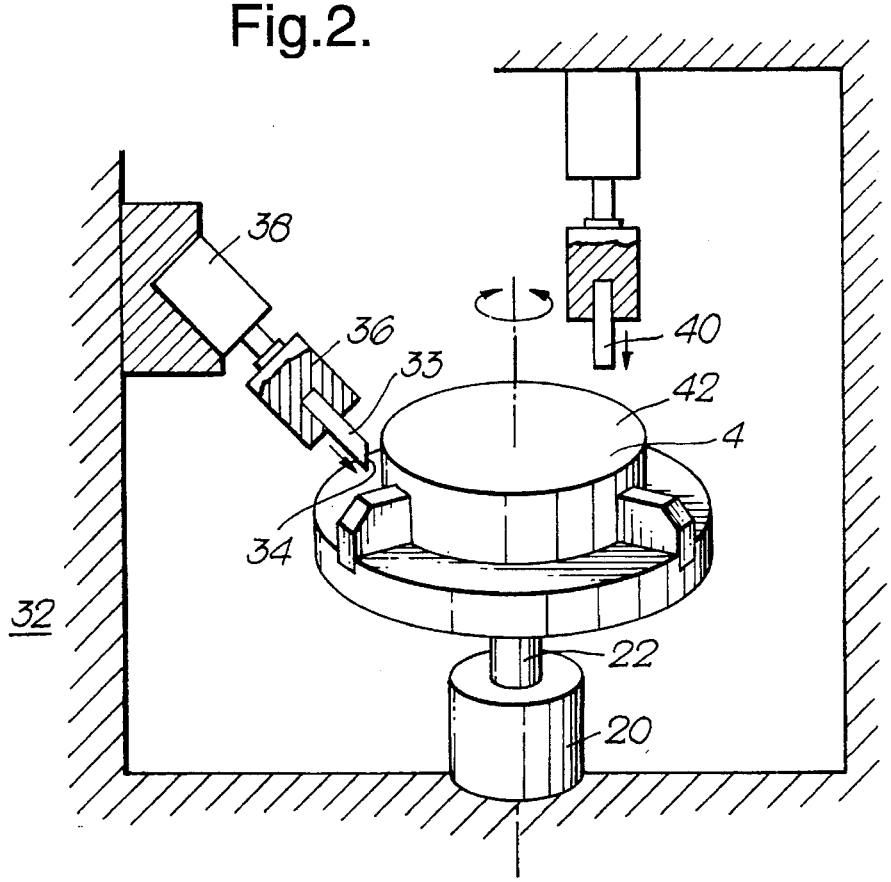
FIG. 2 shows schematically further angular friction welding techniques.

The first component holder 2 is shown schematically in FIGS. 1 and 2 as a circular table fitted with a plurality of clamping features for securing the disc or drawn to the first component holder in the form of the table. A preferred form of welding machine including a specially developed reciprocating table and holding tooling will be described below with reference to FIGS. 3 to 9 of the drawings.

FIG. 2 shows a further illustration of the principle with reference to the diagrammatic machine of FIG. 1, in which like parts carry like references. In this example the weld-pressure generating force is applied in non-radial directions.

A component 32 is to be joined to the periphery of the component 4 at an oblique angle. The component 32 is held against the circumferential side of the blisk or blum 4 at an angle inclined relative to the plane of the disc. The interface forming end face 34 is correspondingly chamfered. As before the component is held by a component holder 36 carried by weld force generating means 38 such that the weld-pressure generating force exerted by the means 38 has an axial component as well as a radial component. During the welding operation the holder 2 is caused to oscillate with angular reciprocal movement, as before, relative to the component 32. Subject to the abutting faces of the two components being correctly aligned. The weld-pressure generating force may lie in the plane defined by a radius and the axis about which the workpiece oscillates angularly, or it may not.

For ease of manufacture it is preferred to attach blades to the periphery of a disc or drum at right angles to the surface thereof. Sometimes, however, the peripheral surface tapers in an axial direction so that the plane of the weld interface must be inclined either with respect to the axis of the angular reciprocatory movement or with respect to the direction of the weld-pressure force.

FIG. 2 also shows a further variation with another component 40 urged against an end surface of the component in a generally axial direction. Thus angular friction welding can be achieved with an axial force, as well as a radial force. Indeed, the first component may be welded to the second component with a radial force, and a third component to a second component with an axial force. Alternatively, the component holder 2 may comprise a reciprocating bed upon which more than one workpiece is mounted so that different components can be welded to the different workpieces simultaneously. As will become clear in the following description of a practical form of welding machine there may be a plurality of second component holders spaced apart circumferentially around the periphery of a disc 4, or drum, so that a plurality of blades may be joined simultaneously to the disc. Essentially the component holders are mounted co-planar and the weld generating forces are applied co-planar.

There now follows a description with reference to the remaining drawings of several practical friction welding machines.

FIGS. 3 to 9 show details of an angular friction welding machine 50 in which a disc or drum 4 of a turbine is mounted on a workpiece holder 51 and is reciprocated angularly about a central axis 52 through an arc having a length of, typically, plus or minus 3 mm. A pair of radially opposed turbine blades 53 are held in component holders 54 and are urged radially towards the disc 51 during welding. Of course, they need not necessarily be truly radially urged, they could have a tangential component of force, and they need not be truly diametrically opposed, they could be offset from that position.

The angular friction welding apparatus comprises a primary, workpiece mounting, angularly moveable member 55 mounted on a rigid base grounding unit 56 which is bolted to a floor 57, a secondary counterbalancing member 58 also mounted on the base unit 56, energy storing or transfer means 59 connecting the workpiece mounting member to the base unit 56, energy storing or transfer means 60 connecting the counterbalancing member to the base unit, torque transfer means 61 coupling the workpiece mounting member and counterbalancing member, and drive means 62 operatively connected to the workpiece mounting member so as to drive it with angular reciprocatory motion. The member 55 may be considered in this example to be an annularly reciprocating table.

The workpiece mounting member comprises a central column 63 having a cylindrical foot 64 at its lower end and a cylindrical head 65 towards its upper end. A workpiece mounting region 66 is provided on top of the head 65. The workpiece mounting member 55 is mounted for reciprocatory angular movement with respect to the base unit 56 by means of hydrostatic bearings 67 which are provided in column members 68 and 69. These bearings generally indicated at 69,60 comprise radial 67a and axial 67b thrust-taking hydrostatic bearings.

The head 65 of the workpiece mounting member is coupled to the base unit 56 by a ring of resilient torsion bars 70. The upper ends of the torsion pars 70 are of a square cross-section and are rigidly held in corresponding square holes in the head 65. The lower end of the torsion bars 70 also have a square section rigidly held in corresponding square holes in the base 56. The ring of torsion bars 70 acts as a torsional spring and serves to absorb kinetic energy or motion of the workpiece mounting member 55 and convert it into potential energy, and release it cyclically.

The counterbalancing member 58 is mounted for reciprocatory angular movement by hydrostatic bearings, or film bearings. The energy storing or transfer means 60 also comprises a ring of flexible torsion bars 71 having their upper end fixedly mounted in the base 56 and their lower end fixedly mounted in the counterbalancing member 58 in a similar manner to the torsion bars 70, but up-side down.

The torque transfer means 61 comprise a pair of elongate diamond-shaped members coupling the head 65 to the annular counterbalancing member 58. The coupling between the torque transfer means 61 and the head comprises effectively a ball joint 72, but with the ball joint having hydrostatic or film bearing surfaces (not shown). There is a similar coupling 74 between the bottom end of the torque transfer means 61 and the counterbalancing member 58. A pair of spigots 73 is provided on the base unit 56 and the mid-regions of the elongate bars 61 of the torque transfer means are pivoted on their respective spigots 73.

The workpiece mounting member 55 and the counterbalancing member 58 comprise a sprung oscillating system, that can be considered to be a torsion pendulum. The system has a natural frequency of oscillation or resonance and we propose to drive the system to oscillate at that natural frequency. A typical natural frequency would be around 35 Hz. We envisage a useful frequency range for the welding machine to be fro about 20 Hz up to about 50 Hz.

The natural or resonant frequency of the system can be altered. We may wish to do this in order to take account of workpieces of different masses, or simply in order to alter or tune the frequency at which we wish to drive the system, which normally will be the natural frequency. A suitable tuning means would alter the natural frequency of the system by, for example, adjusting the angular moment of inertia of the workpiece mounting member, by for example, altering its mass, or by moving mass towards or away from the central axis 52; by adjusting the amount of inertia of the counterbalancing means 58 in a similar manner; by adjusting the stiffness of the springs in the system in some way as by for example decoupling one or more of the torsion bars 70 or 71, preferably in symmetrically disposed pairs or by adjusting their effective length using a selectively decouplable clamp means; or in some other way.

Figure 4:
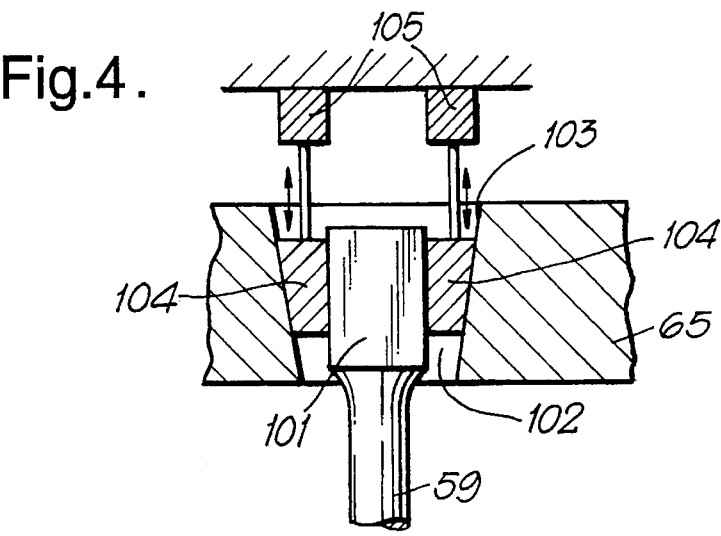
FIG. 4 shows detail of the machine of FIG. 3.

A suitable selectively decouplable clamping means is schematically shown in FIG. 4. The top end of one or more of the energy storing torque rods 59 have a square cross section and have flat sides 101. The angularly reciprocating head 65 has square tapered holes 102 with tapering flat sides 103, the top end of the rods 59 extending into the holes 102. Locking wedges 104 are movable into and out of their operative positions by an actuating mechanism 105. With the wedges 104 raised a rod 59 is not coupled to the head 25. With the wedges driven downwards the upper end of the rod 59 is locked relative to the head 103. The actuating mechanism 105 may be carried by the head 65 and move with it. There are preferably four wedges 104: one for each keying surface of the rod 59. The actuating mechanism 105 operates automatically, for example at the press of a button so that a user cannot mis-tighten the wedges. There may be a safety system such that the apparatus cannot be started before the rod 59 is either fully clamped or fully released. It is not desirable to allow the machine to be operated with the rod 59 partially clamped. Of course a similar arrangement can be used with rods 60, either instead of or in addition to that used with a least one of rods 59, and preferably with more than one rod.

Figure 3:
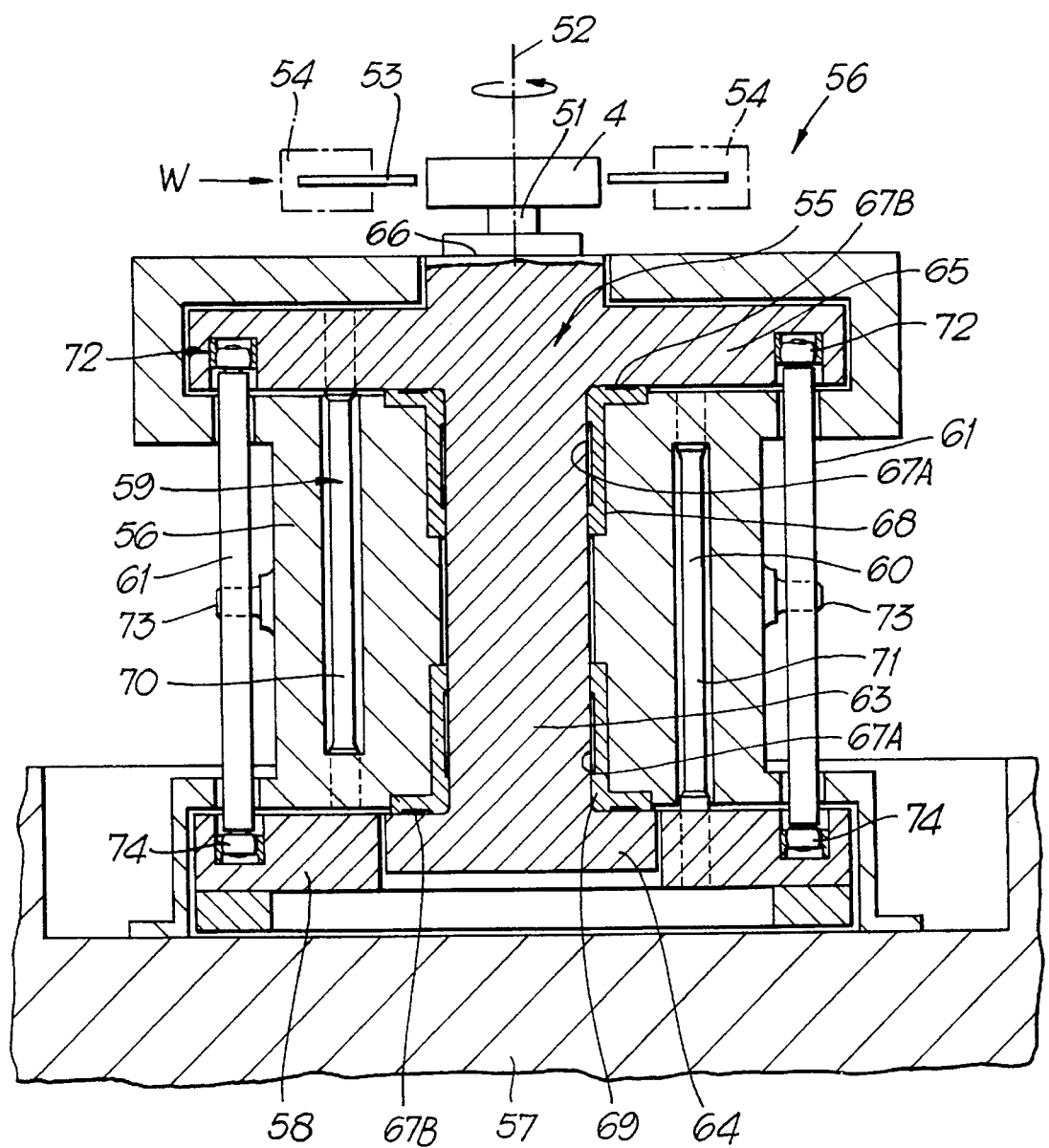
FIG. 3 shows an angular friction welding machine.

In FIG. 3 there are shown two interdigitated sets each of 9 torsion bears 70 and 71. It is preferred to have each set of torsion bars comprising diametrically opposed pairs of bars as this make it more convenient to switch them in and out of operation and maintain the angular symmetry of the system. It will also be appreciated that there need not, necessarily, be the same number of torsion couplings to the member 55 as there are to the member 58. The two sets could also be at different radii, but are shown at the same radius in the drawing.

It will be noted that the transfer bars 61 are symmetrically disposed about the axis 52. This means that they are self balancing. So are the torsion coupling means 70,71.

By having a large number of torsion bears we can adjust the natural frequency of the system by taking them in and out of an operative condition in relatively small steps. Furthermore, it also assists in balancing the system.

An advantageous feature of the angular friction welding apparatus 50 is that it can start welding at zero stroke. In some welding machines it is necessary to have the component and the workpiece at their maximum stroke to begin welding and this can cause large initial loads.

It will be appreciated that we can drive the system at a frequency other than its natural frequency, and indeed that the utilisation of the system will not be too far removed from its optimum peak if we drive at a frequency reasonably above or reasonably below the natural frequency. For example, we would envisage driving in the range of 20 to 50 Hz if the natural frequency was 35 Hz, of course, we would ideally drive at 35 Hz.

It will be appreciated that the torque transfer means 61 maintains synchronous movement between the workpiece mounting member 65 and the counterbalancing member 58 and avoids the possibility of their movement being out of phase due to spring effects, and allows the operating of the machine away from the natural frequency.

It will be appreciated that we could arrange the machine without earthing the member 55 and the member 58. That is members 59 could be connected directly between members 55 and 58, but we prefer to earth them to a ground because this gives a definite centre to the system. If the system were not earthed it would be very difficult to say where its centre point was. This may be important when setting up the apparatus before welding.

In other version of the apparatus we could support the table 51 directly on the upper ends of the torsion bars 59 and we could omit the hydrostatic thrust bearing 67. This may alleviate problems associated with maintaining clearances for hydrostatic thrust bearing 67B.

It will be appreciated that the component holders 54 operate on substantially radial slides and are urged radially inwards by weld-pressure generating means.

Thus the principle of the angular friction welding is to reciprocate the workpiece and then apply a radial welding force between the components and the workpiece. Ideally the component is fed in radially, but it could be fed in at any angle so long as there is a radial component. The weld "plane" is in fact a portion of a surface of a solid of revolution centred on the axis 52 of angular reciprocation.

Figure 5:
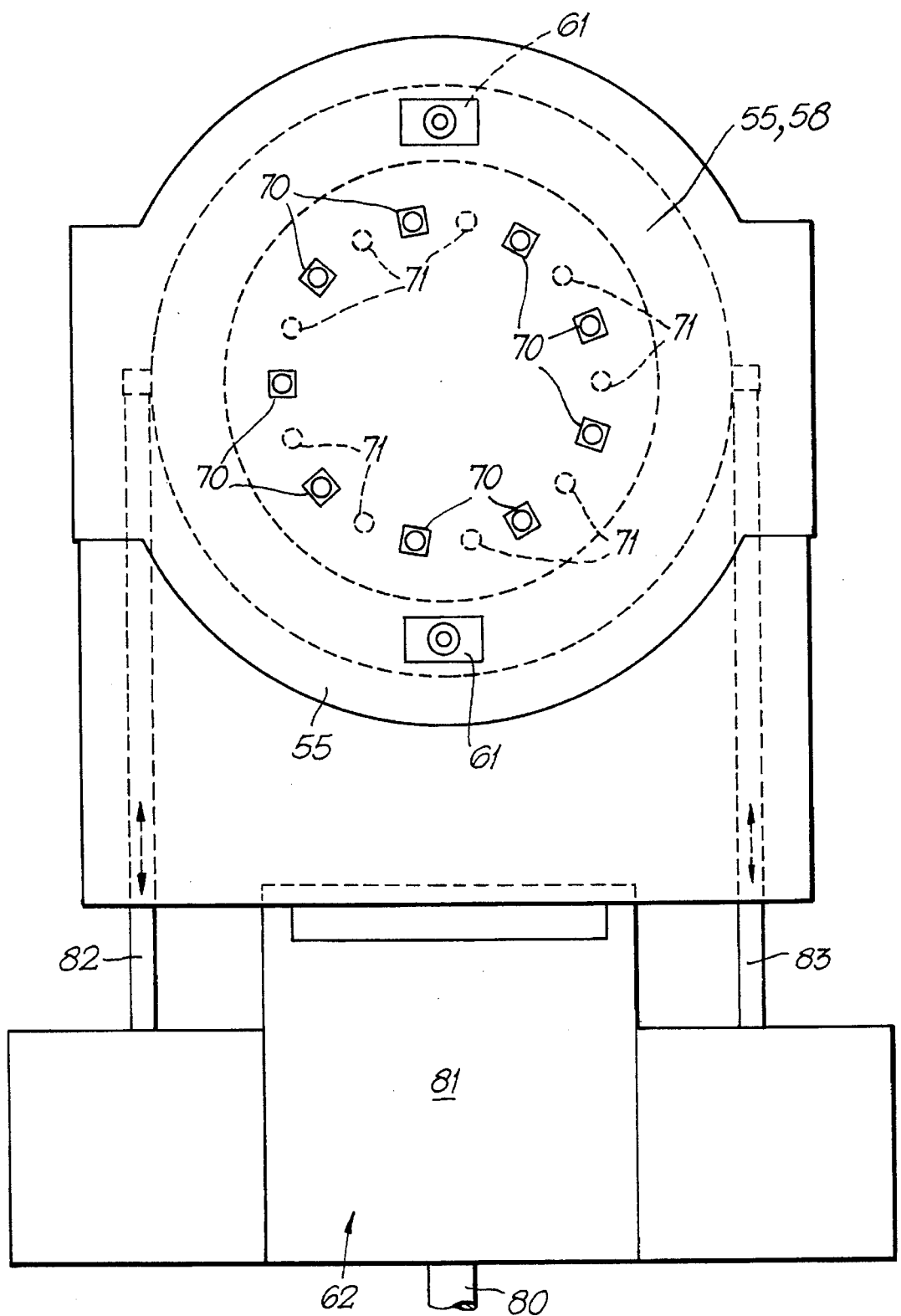
FIG. 5 shows a top view of the machine of FIG. 3.

FIG. 5 shows the reciprocatory drive means 62 for the apparatus 50. There is a linear reciprocatory input drive shaft 80, which may be the input to a known type of linear reciprocation drive mechanism, extending into a conversion unit 81, and two output shafts 82 and 83 extending from the conversion unit 81. These two output shafts 82,83 are arranged to drive a driven member in the welding apparatus itself. The driven member is either the workpiece mounting member 55 or the counterbalancing member 58 or possibly both. In the drawing the driving shafts 82, 83 are coupled to the driven member by ball joints, and the driven member is indicated by alternative references 55,58.

Figure 6:
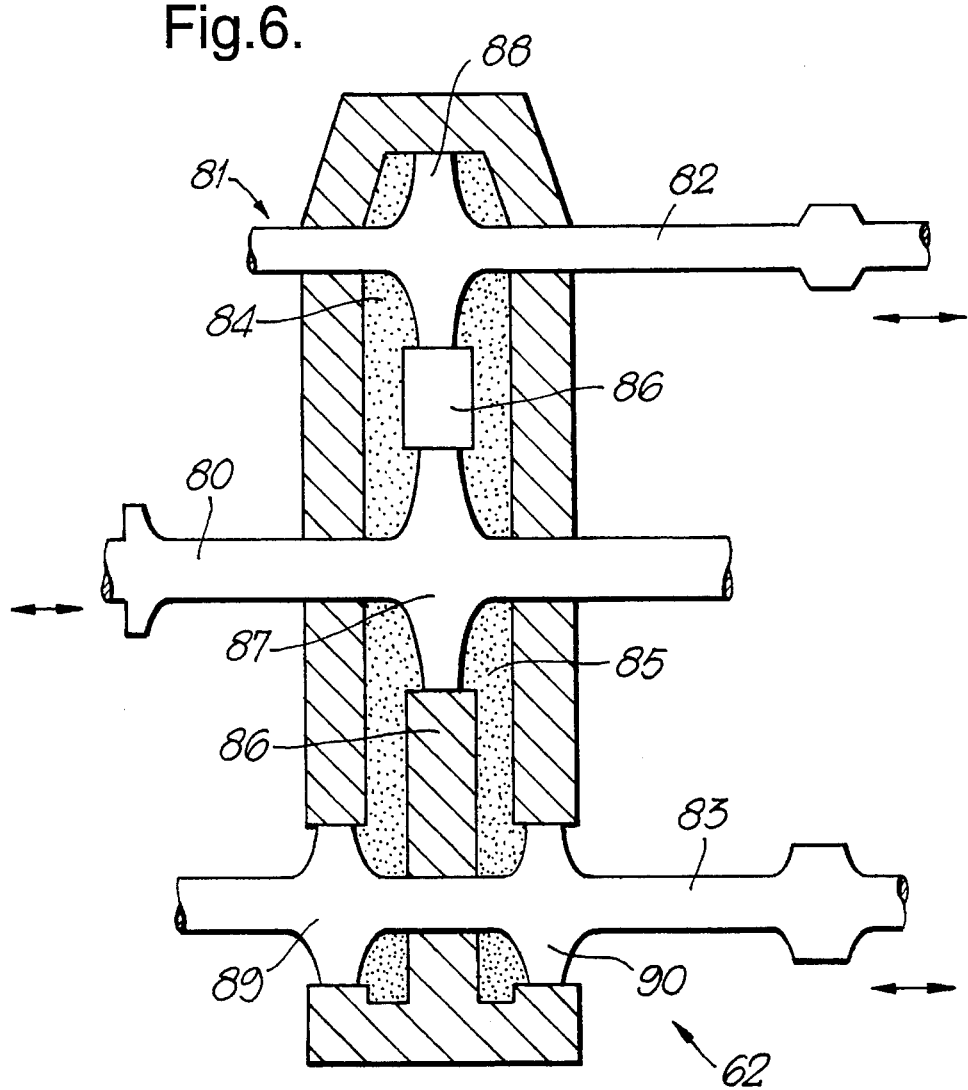
FIG. 6 shows schematically the conversion unit or reciprocatory drive means of the machine of FIG. 3.

When the input shaft 80 moves upwards to the left as shown in FIG. 6 the output shaft 82 moves upwards in FIG. 5, to the right in FIG. 6, and the output shaft 83 moves in the opposite direction, downwards in FIG. 5 and to the left in FIG. 6.

The operative ends of the output shafts 82 and 83 are connected to radial attachment points on the workpiece mounted member 55 at opposite ends of a diameter of the driven member. This is schematically shown in FIG. 5.

Thus the output shafts 82 and 83 apply a reciprocating angular torque to the member 55.

The conversion unit 81, shown in more detail with reference to FIG. 6 of the drawing, comprises two chambers 64 and 65 of hydraulic fluid separated by a dividing wall 86 and by an input piston assembly 87 operating in a bore in the dividing wall 86 and by an output piston assembly 88 operating in another bore in the dividing wall. The second output shaft 83 has two piston assemblies 89 and 90. The piston assembly 89 experiences the pressure of the hydraulic fluid in chamber 84, and the piston assembly 90 the hydraulic pressure of the fluid in chamber 85.

As the input shaft 80 is driven forwards, to the right in FIG. 6, the local volume in chamber 85 decreases and this is made up for by an increase in local volume elsewhere in the chamber. The output shaft 82 moves backwards, to the left in FIG. 6, and the other output shaft 83 moves forwards, to the right in FIG. 6. Thus the two output shafts 82 and 83 move in anti-phase.

Figure 7:
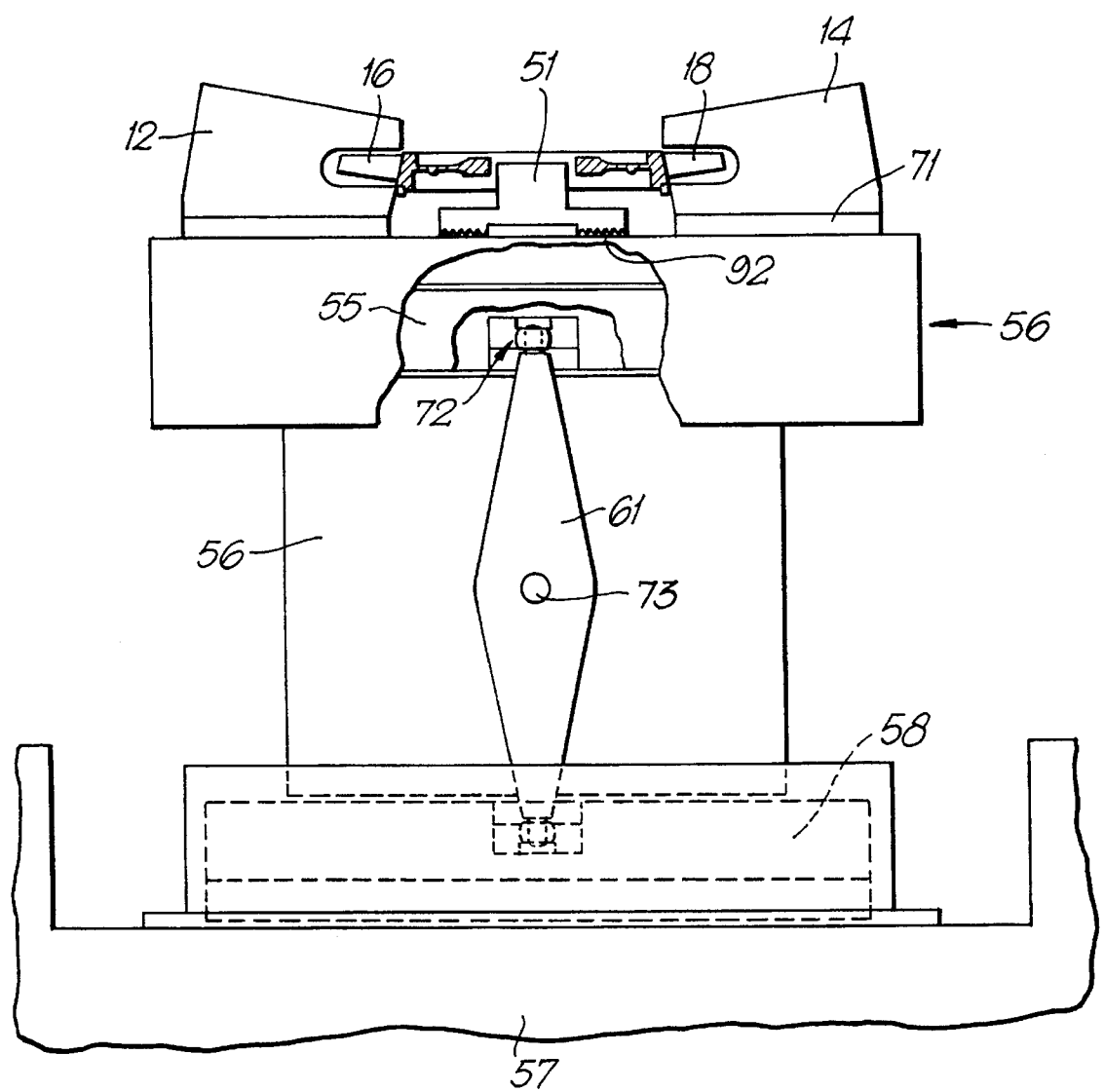
FIG. 7 shows another view of the machine of FIG. 3.

FIG. 7 shows a disc 51 held in a workpiece holder 51. Parts corresponding to those shown in FIG. 3 carry like references. The workpiece holder 51 can be indexed angularly to different positions relative to the workpiece mounting table. The underside of the workpiece holder has a ring of teeth, referenced 92, which co-operate with a complementary ring of teeth on top of the workpiece locating region of the head 55. However, in this arrangement the indexing is achieved by releasing a gripping force clamping the entire workpiece holder 51 to the ring of teeth on the top of the workpiece mounting region 66, separating the teeth of the workpiece mounting region 66 and the teeth 92, indexing the entire cartridge assembly of the workpiece holder 51 to the next allowable position, and re-clamping the two sets of teeth together so as to make the cartridge workpiece holder 51 immovable angularly relative with the workpiece mounting region 66. It will be appreciated that the spacing of the two sets of teeth assists in determining the index positions since they will tend naturally to make any slight adjustments for a slightly incorrectly aligned workpiece holder 51 so long as the two sets of teeth engage in the correct projection/recess mating combination.

Figure 8:
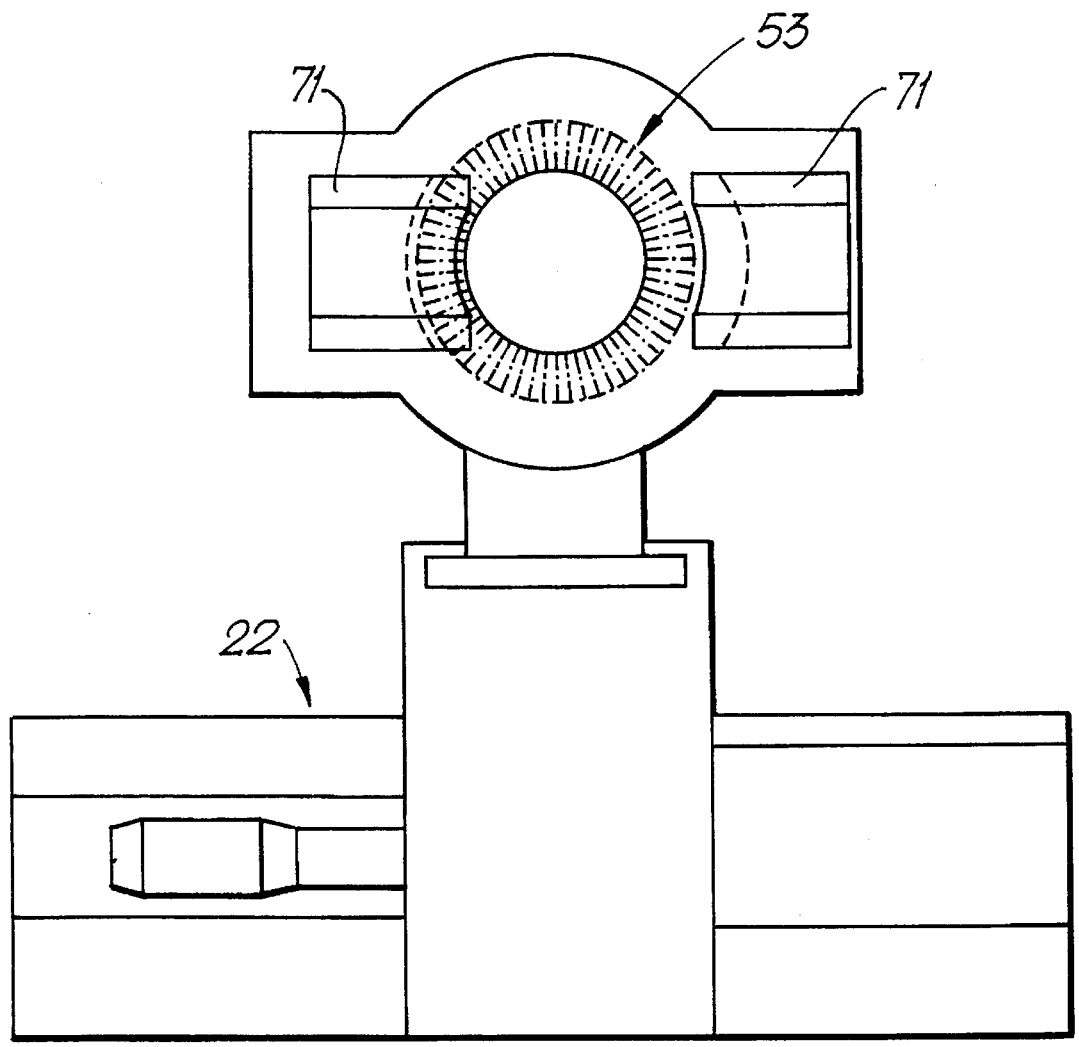
FIG. 8 is a schematic top view of another friction welding machine.

FIG. 8 is a general plan view of the machine of FIG. 3 and shows the pair of substantially diametrically opposed slides 71 on which the component holders 54 are mounted. It also shows schematically a large number of blades, or positions where blades are to be welded to the disc 4 in the course of manufacturing a blisk.

Figure 9:
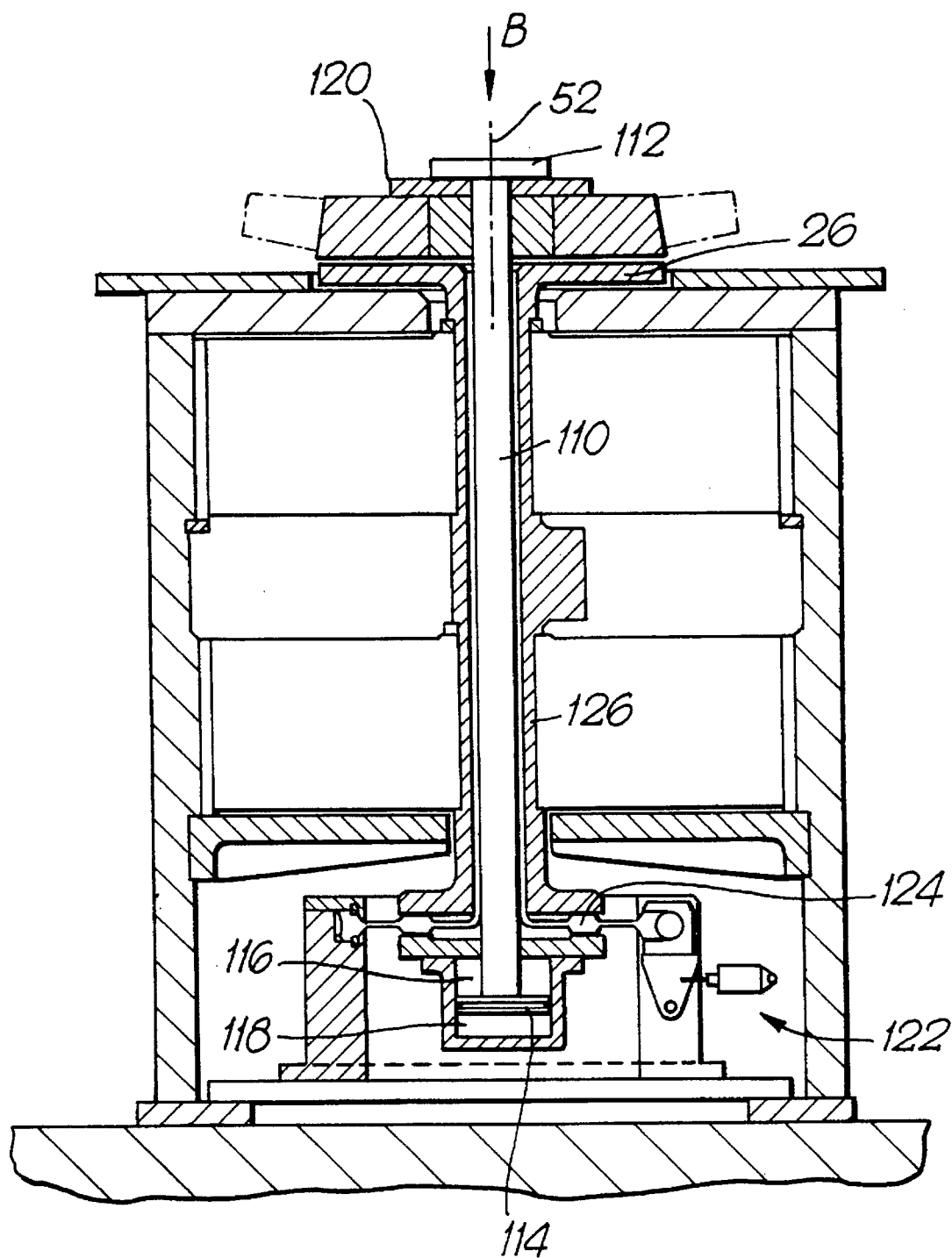
FIG. 9 shows a side view of another friction welding machine.

FIG. 9 shows a way of applying a clamping or holding force B to the workpiece 4. A central pull rod 110 extends along the axis 52 of the friction welding apparatus and has at its upper end a head 112 and at its lower end a piston 114 with first and second hydraulic chambers 116 and 118 above and below it. During friction welding the chamber 116 is pressurised and the head 117 pulls down on the upper member 120 of the workpiece holder to clamp the workpiece holder to the workpiece mounting region 66. After welding, during indexing, the chamber 118 is pressurised (and the chamber 116 de-pressurised) so as to raise the head 112, releasing the clamping pressure on the blisk. The blisk is keyed to the workpiece mounting region 66. An indexing mechanism 122 is moveable into and out of engagement with an indexing ring 124 which indexes the workpiece mounting region 26 via an axial column 126.

It will be appreciated that the same idea of an axial pull member can be used to clamp the workpiece holder 51 to the friction welding apparatus 56 shown in FIG. 3. The indexing of the entire workpiece holder 51 will of course not mean indexing of the workpiece mounting region 66 in that case. However, a central pull rod equivalent to rod 110 could be provided in the arrangement of FIG. 3 to clamp the workpiece holder to the mounting region 26.

We may wish to convert the apparatus of FIG. 3 to be able to weld in a plane normal to the axis about which it reciprocates. A removable conversion unit may be provided to achieve this, the unit fitting on the top of the table. Component holding means would then be provided on the unit. We may be able to weld on top of the unit as well as on the "sides" of the component holder table, and even both simultaneously.

In a modification of the arrangement of FIG. 3 the reciprocating workpiece mounting table 65 could be supported on torsion bars which have their bottom ends simply embedded in the ground or in a base member. There need be not hydrostatic bearings or counterbalancing member.

We claim:

1. A method of friction welding a component to a circular periphery of a disk in the manufacture of an integrally bladed disk, comprising the steps of:

clamping end surfaces of the disk in a workpiece holder such that the circular periphery remains exposed;

producing relative angular reciprocatory movement of the workpiece holder and the disk about a rotation axis extending substantially normal to the end surfaces, clamping a component to be welded to the circular periphery of the disk in a component holder disposed to move in a direction substantially perpendicular to the rotation axis, exerting a force in a direction substantially perpendicular to the rotation axis to urge the component against the circular periphery of the disk to create friction at an interface between the component and the disk such that sufficient heat is generated to reach a temperature at which the component and disk are weldable, and ceasing the angular reciprocatory movement and exerting a weld-pressure generating force in a direction substantially perpendicular to the rotation axis to urge the workpiece and component together and to thereby create a weld.

2. A method of friction welding as claimed in claim 1 wherein to weld a plurality of components to the disk, a plurality of friction generating forces and weld-pressure generating forces are applied to the plurality of components whereby the plurality of components may be welded simultaneously to the disk.

3. Apparatus for performing a method of friction welding comprising a workpiece holder for holding a disk, the workpiece holder being clampable on end surfaces of the disk such that a circular periphery of the disk remains exposed, wherein the workpiece holder is rotatable about a rotation axis extending substantially perpendicular to end surfaces of the disk, at least one component holder for holding at least one component to be welded to the circular periphery of the disk, the component holder being disposed to urge the component towards the disk in a direction substantially perpendicular to the rotation axis, wherein the workpiece holder is rotatable to generate friction through relative angular reciprocatory movement between the circular periphery of the disk and the component urged against the disk by the component holder such that the component is weldable to the disk.

4. Apparatus as claimed in claim 3 comprising a plurality of component holders wherein the component holders are spaced apart circumferentially around the workpiece holder.

5. Apparatus as claimed in claim 4 wherein the plurality of component holders are disposed to be co-planar.

6. Apparatus as claimed in claim 3 wherein the weld-pressure generating forces applied to the component holders are co-planar.

7. Apparatus as claimed in claim 6 wherein the weld-pressure generating forces applied to the component holders are diametrically opposite each other.

8. Apparatus as claimed in claim 1 further comprising at least one second component holder for holding a second component to be welded to the disk, means for producing relative angular reciprocatory movement between the workpiece holder and the component holder and second component holder, and means for applying a weld-pressure generating force to urge the disk and the second component together thereby causing friction welding to take place approximately simultaneously by angular reciprocatory movement between the disk and the component, and the disk and the second component.

9. Apparatus as claimed in claim 8 wherein the weld-pressure generating forces applied to the component holder and second component holder are not co-planar.

10. Apparatus as claimed in claim 9 wherein a weld-pressure generating force applied to the second component holder has a substantially axial component.

11. Angular friction welding apparatus as claimed in claim 3 further comprising a counterbalancing member operatively coupled to the workpiece holder, and the counterbalancing member is adapted to angularly reciprocate in opposition to the workpiece holder.

12. Angular friction welding apparatus as claimed in claim 11 further comprising torque transfer means provided between the workpiece holder and the counterbalancing member adapted to convert kinetic energy into potential energy and realize it cyclically.

13. Angular friction welding apparatus as claimed in claim 11 further comprising torque transfer means arranged to couple the workpiece holder directly to the counterbalancing member.

14. Angular friction welding apparatus as claimed in claim 13 wherein the torque transfer means comprises energy storing means coupling the first workpiece holder to a base member and second energy storing means coupling the counterbalancing member to the base member whereby the apparatus has a natural frequency of oscillation.

15. Angular friction welding apparatus as claimed in claim 13 wherein the torque transfer means comprises at least one resilient coupling member.

16. Angular friction welding apparatus as claimed in claim 15 wherein the at least one resilient coupling member are elongate in a generally axial direction.

17. Angular friction welding apparatus as claimed in claim 15 wherein the at least at least one resilient coupling member coupled to at least one of the workpiece holder and the counterbalancing member is selectively de-couplable to tune the natural frequency of the apparatus.

18. Angular friction welding apparatus as claimed in claim 11 wherein at least one of the workpiece holder and the counterbalancing member are symmetrically disposed about a diameter of the apparatus in a direction perpendicular to the axial direction.

19. Angular friction welding apparatus as claimed in claim 15 wherein the elongate members are pivotably coupled to at least one of the workpiece holder and the counterbalancing member.

20. Angular friction welding apparatus as claimed in claim 19 wherein the elongate members are pivotably mounted on a base member at an intermediate point in their longitudinal length.

21. Angular friction welding apparatus as claimed in claim 11 wherein at least one of the workpiece holder and the counterbalancing member are mounted on the base member via one of hydrostatic and film bearings.

22. Angular friction welding apparatus as claimed in claim 11 further comprising reciprocatory drive means arranged to drive a driven member comprising at least one of the workpiece holder and the counterbalancing member angularly about the axis for angular friction welding reciprocatory movement.

23. Angular friction welding apparatus as claimed in claim 22 wherein the drive means has at least two output members that reciprocate in opposite directions and out of phase.

24. Angular friction welding apparatus as claimed in claim 23 wherein the two output members are attached to opposite ends of a diameter of the driven member.

25. Angular friction welding apparatus as claimed in claim 23 wherein one of the two output members is connected to the workpiece holder, and the other to the counterbalancing member, and the drive means drives both the first component holder and the counterbalancing member.

26. Angular friction welding apparatus as claimed in claim 22 wherein the drive means includes conversion means adapted to convert reciprocatory movement of an input member into reciprocatory movement of the first output member and reciprocatory movement of the second output member out of phase with that of the first member.

27. Angular friction welding apparatus as claimed in claim 26 wherein the reciprocatory movement of the first output member and the reciprocatory movement of the second output member are out of phase.

\* \* \* \* \*